(12) United States Patent
Cho

(10) Patent No.: US 12,043,501 B2
(45) Date of Patent: Jul. 23, 2024

(54) VACUUM MULTI-SENSING UNIT

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 388 days.

(21) Appl. No.: 17/310,010

(22) PCT Filed: Nov. 11, 2020

(86) PCT No.: PCT/KR2020/015733
§ 371 (c)(1),
(2) Date: Jan. 20, 2022

(87) PCT Pub. No.: WO2021/101154
PCT Pub. Date: May 27, 2021

(65) Prior Publication Data
US 2022/0153536 A1    May 19, 2022

(30) Foreign Application Priority Data
Nov. 19, 2019 (KR) .......... 10-2019-0148948

(51) Int. Cl.
*B65G 47/91* (2006.01)
*G01L 21/00* (2006.01)

(52) U.S. Cl.
CPC .......... *B65G 47/917* (2013.01); *G01L 21/00* (2013.01)

(58) Field of Classification Search
None
See application file for complete search history.

(56) References Cited

U.S. PATENT DOCUMENTS 6,522,935 B1    2/2003    Imaizumi et al.
7,000,367 B2    2/2006    Sung
(Continued)

FOREIGN PATENT DOCUMENTS

CN    110702307 A  *  1/2020
KR    100320503 B1     1/2002
(Continued)

OTHER PUBLICATIONS

International Search Report dated Feb. 2, 2021 from PCT Application No. PCT/KR2020/015733.
(Continued)

*Primary Examiner* — Peter J Macchiarolo
*Assistant Examiner* — Jermaine L Jenkins
(74) *Attorney, Agent, or Firm* — INNOVATION CAPITAL LAW GROUP, LLP; Vic Lin

(57) ABSTRACT

The present invention relates to a vacuum multi-sensing unit (10) used for adhesion and transfer of an object (P) together with a vacuum pump (23) in a vacuum transfer system. The multi-sensing unit (10) of the present invention includes a plurality of sensors (13) to perform multi-sensing, wherein individual and collective control of the built-in sensors (13) is possible. Therefore, in particular, when a plurality of vacuum pumps (23) are required for transfer of objects (P), the plurality of vacuum pumps (23) are allowed to correspond to a single unit (10), and thus, compared to a conventional sensing unit individually attached to each vacuum pump, there is superior effect in terms of the efficiency of manufacture, installation, management, operation, and control of the unit (10).

14 Claims, 7 Drawing Sheets

(56) References Cited

U.S. PATENT DOCUMENTS

| | | |
|---|---|---|
| 7,706,925 B2 | 4/2010 | Ding et al. |
| 8,623,457 B2 | 1/2014 | Ashizawa |
| 9,640,344 B2 * | 5/2017 | McFarland ........ H01H 35/2607 |
| 10,274,392 B2 * | 4/2019 | Gehm .................. G01L 27/005 |
| 10,558,190 B2 | 2/2020 | Nagai et al. |
| 2007/0235668 A1 | 10/2007 | Goldman et al. |
| 2011/0174380 A1 | 7/2011 | Itafuji et al. |
| 2011/0208362 A1 | 8/2011 | Alstrin et al. |
| 2015/0039099 A1 | 2/2015 | Mizutani |

FOREIGN PATENT DOCUMENTS

| | | | |
|---|---|---|---|
| KR | 20050027372 A | 3/2005 | |
| KR | 100523544 B1 | 10/2005 | |
| KR | 101463041 B1 | 11/2014 | |
| KR | 200484124 Y1 | 8/2017 | |
| KR | 101860643 B1 | 5/2018 | |
| KR | 20180050932 A | 5/2018 | |
| KR | 20180129755 A | 12/2018 | |
| KR | 102096365 B1 | 4/2020 | |
| WO | 2013144581 A1 | 10/2013 | |

OTHER PUBLICATIONS

VTEC/KPS Co., Ltd. Catalog [Vacuum Technology-1] Ver. 4. 10i, Jan. 1, 2020.

* cited by examiner

【FIG. 1】 Prior Art
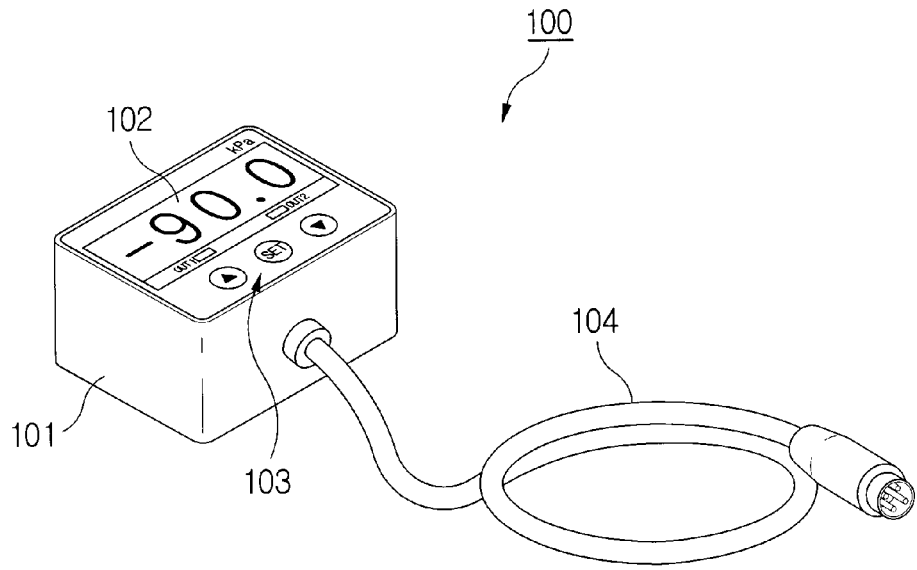
【FIG. 2】 Prior Art
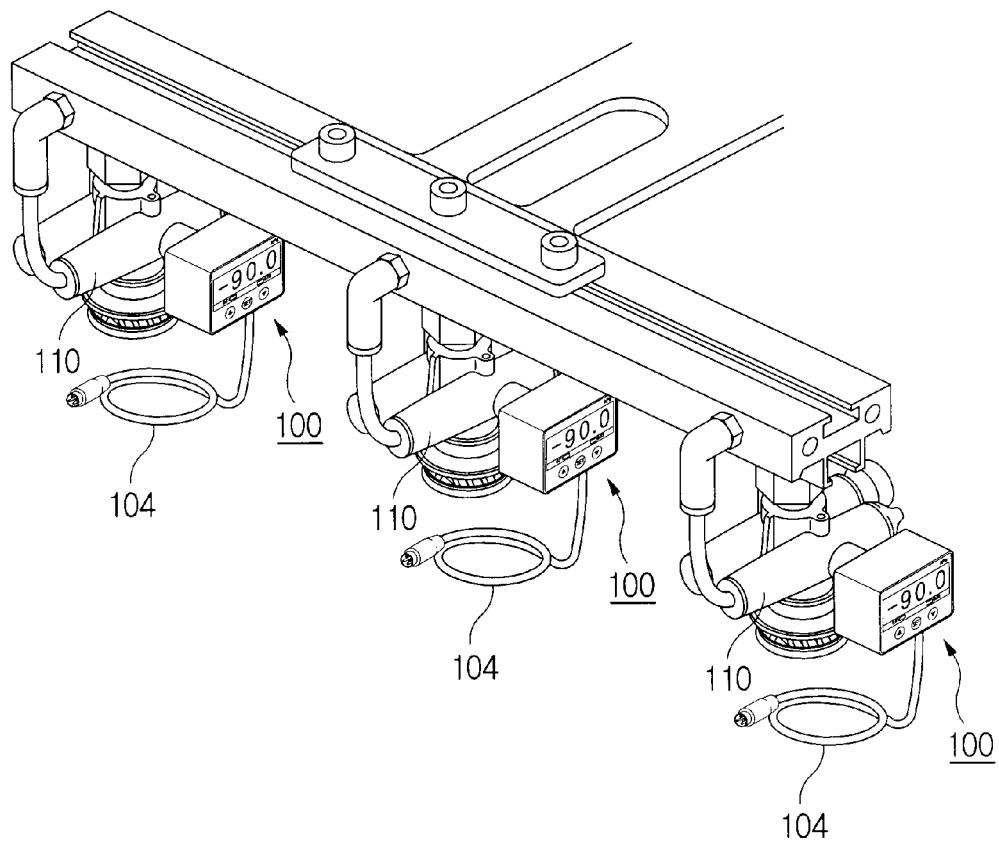

【FIG. 3】
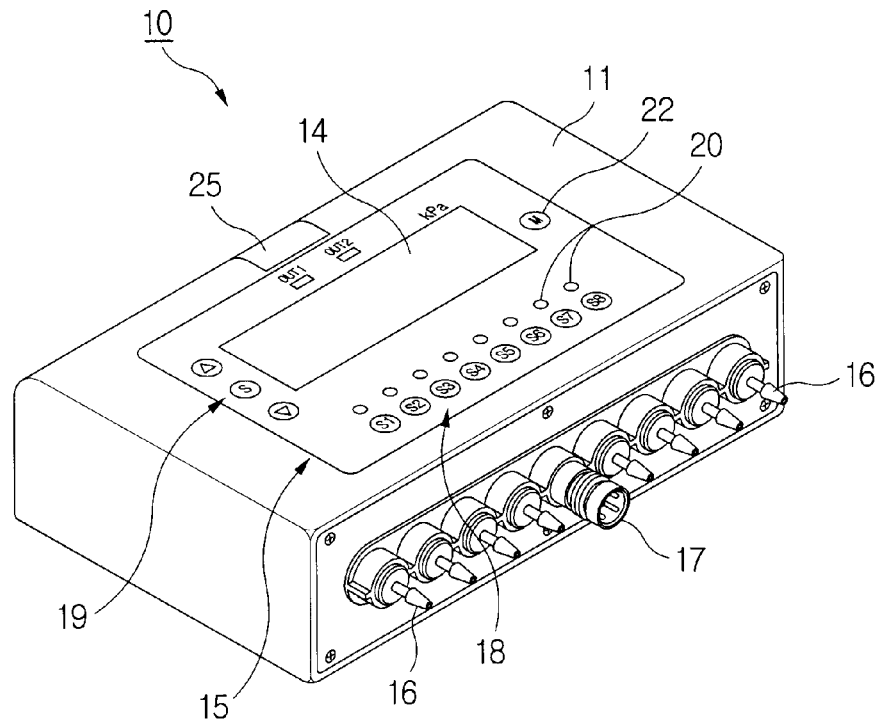
【FIG. 4】
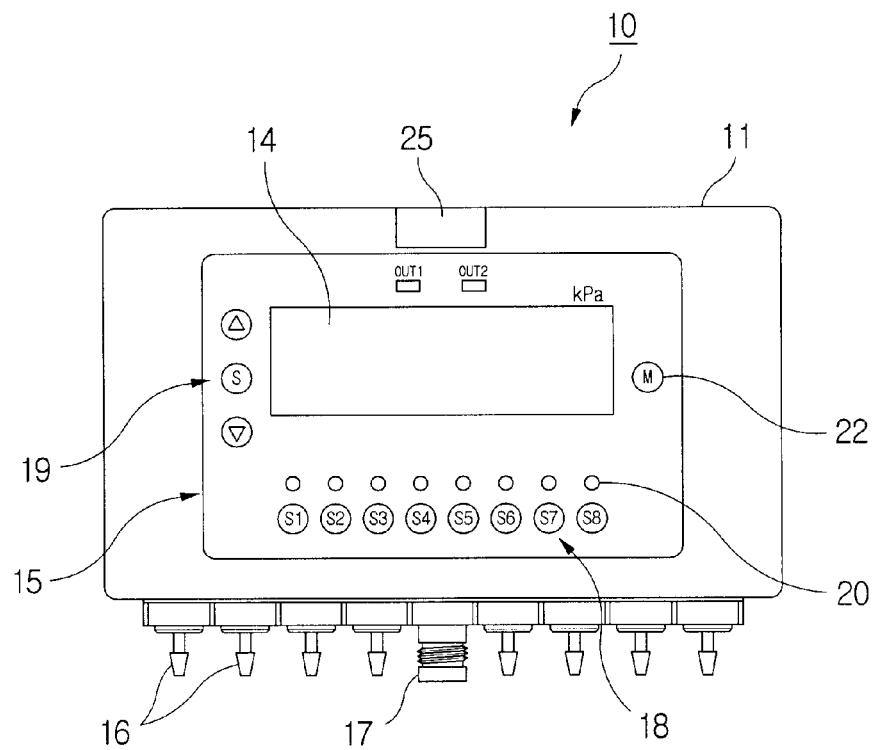

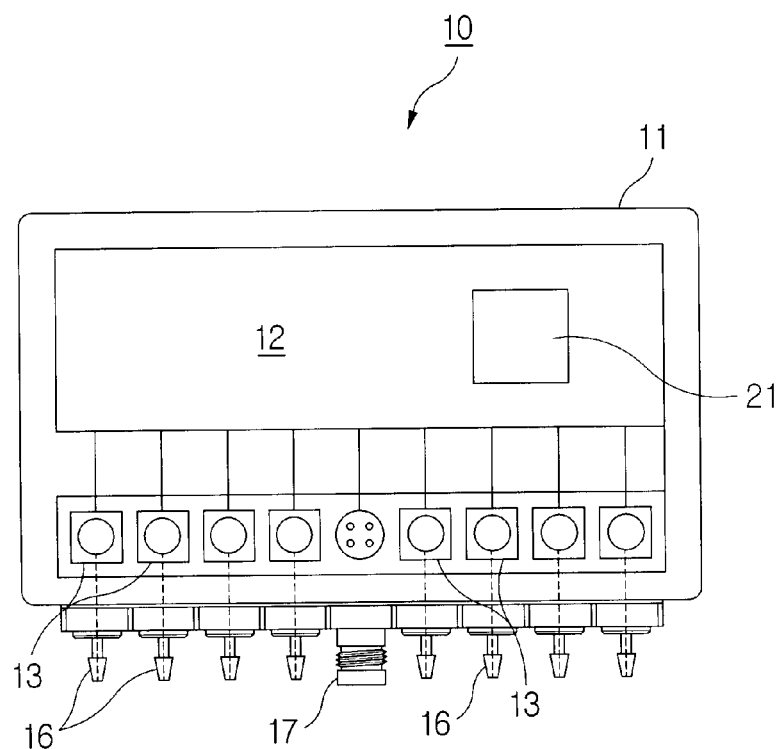
[FIG. 5]

[FIG. 6]
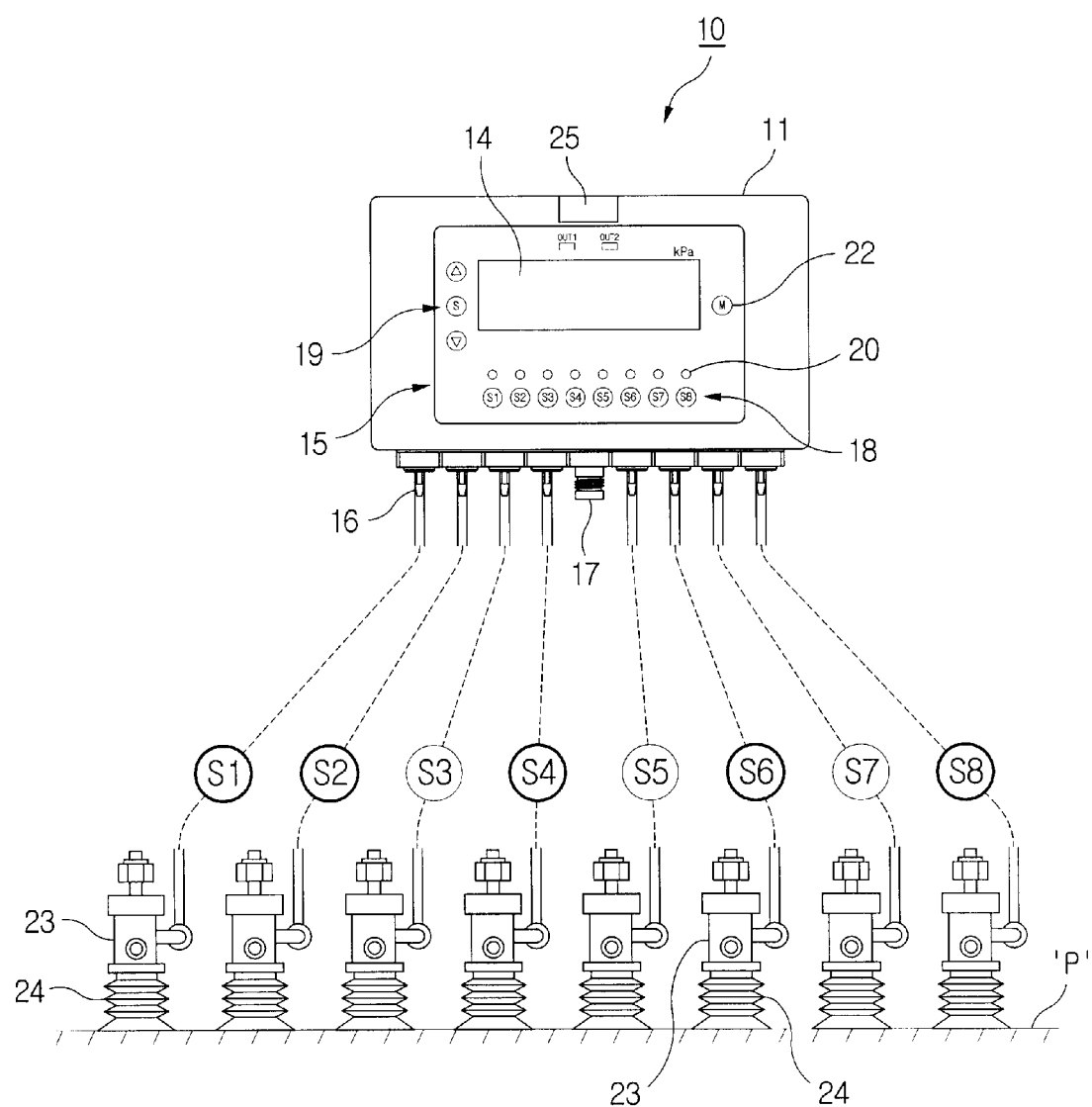

[FIG. 7]
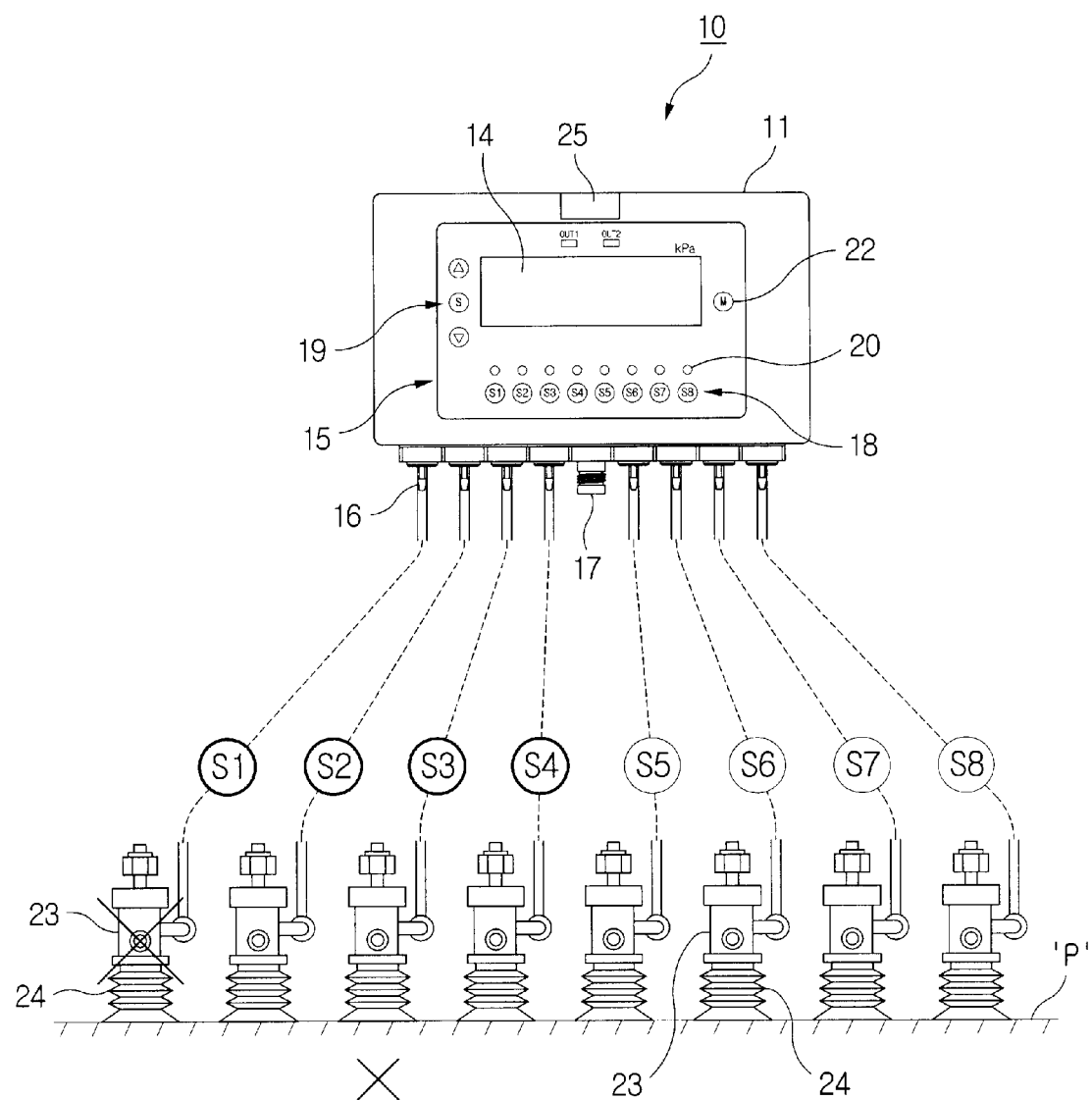

[FIG. 8]
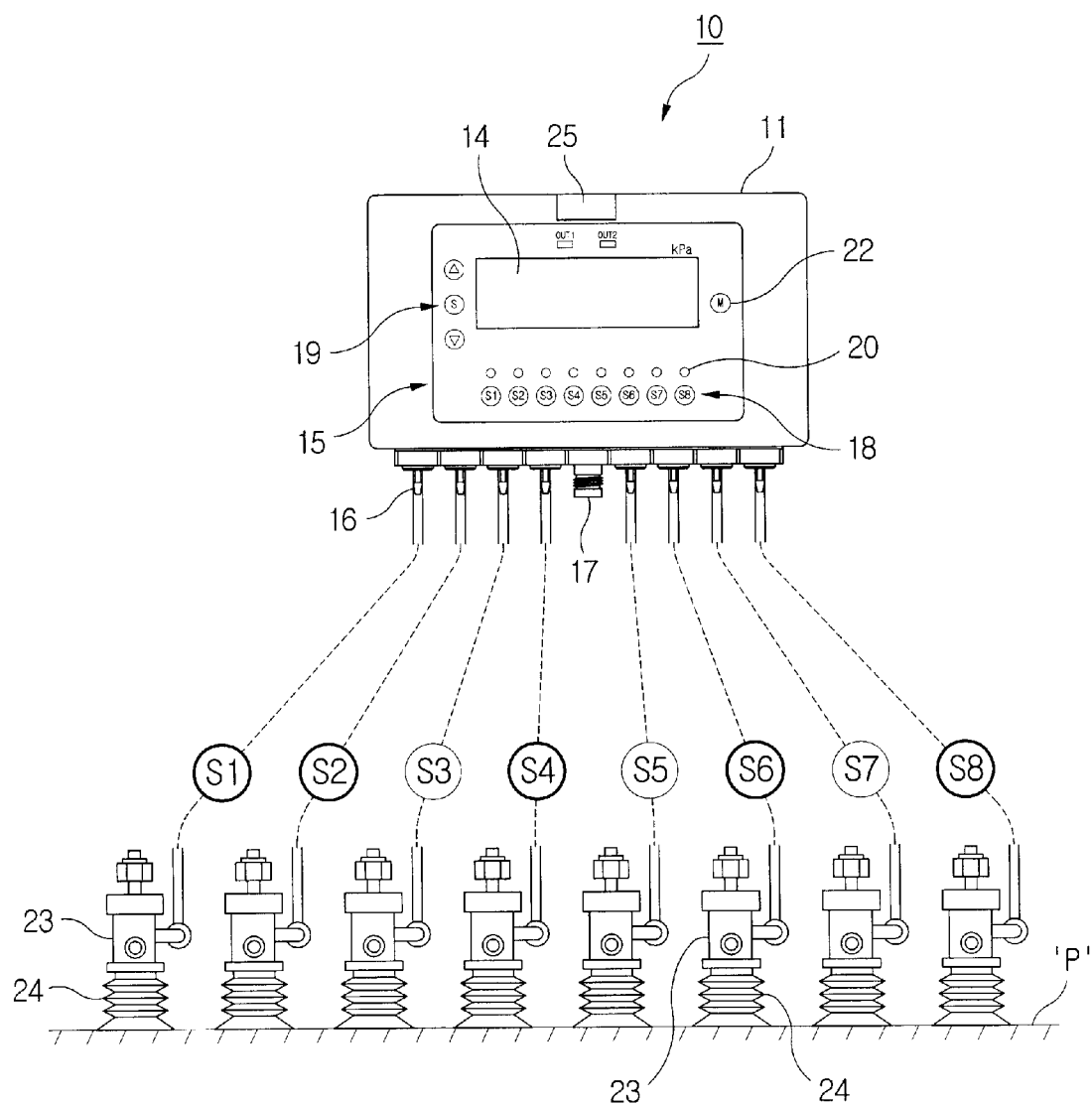

[FIG. 9]
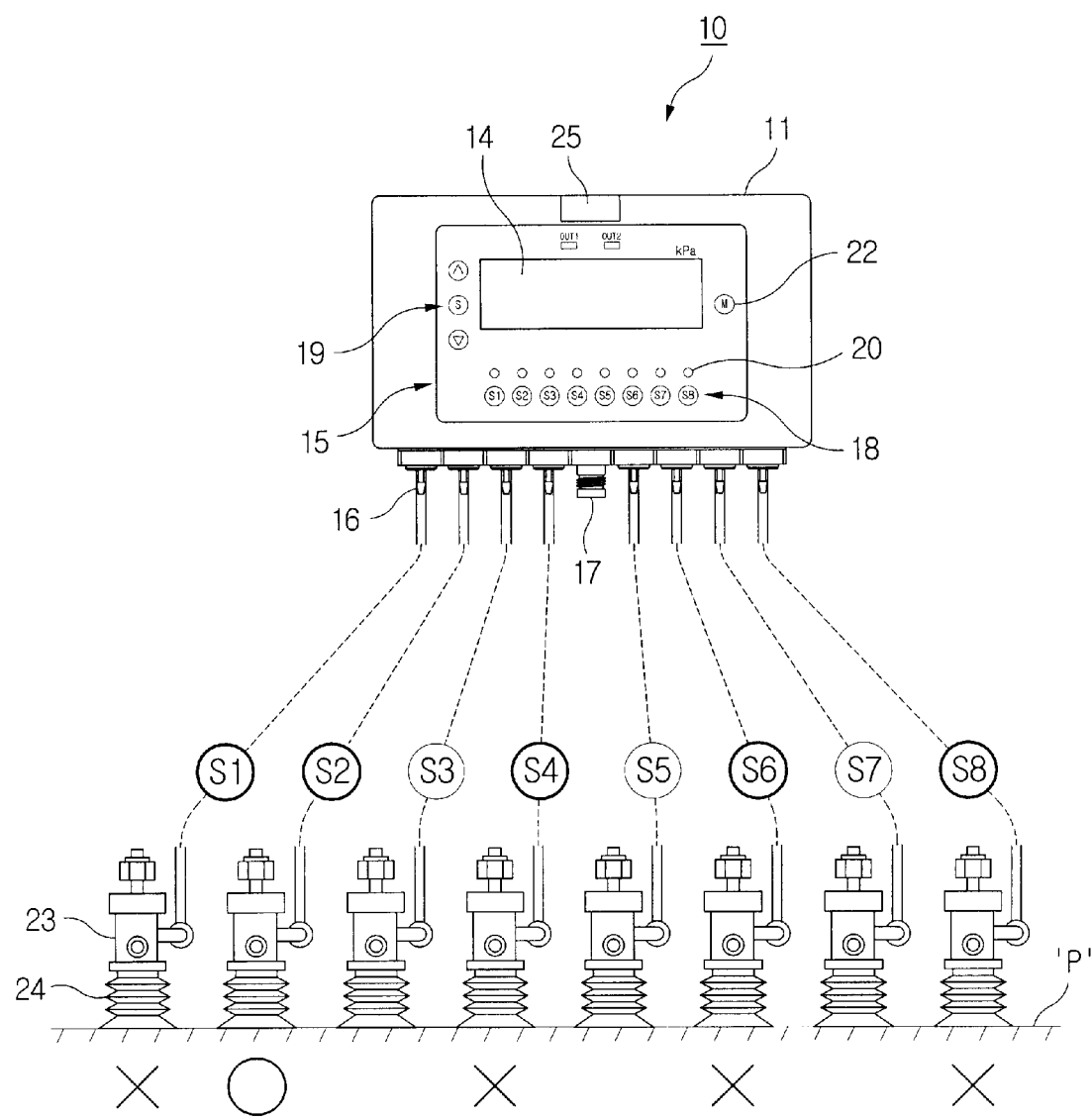

VACUUM MULTI-SENSING UNIT

TECHNICAL FIELD

The present invention relates to a vacuum sensing unit used in a vacuum transfer system, and more particularly, to a multi-sensing unit designed to be capable of corresponding to a plurality of vacuum pumps.

BACKGROUND ART

A vacuum transfer system refers to a system, which generates a negative pressure therein by exhausting a gas in an adsorption means having a pad, a cup, and the like by using a vacuum pump operating by compressed air so as to transfer an object to a predetermined place after adsorbing and holding the object by using the generated negative pressure. In terms of the exhaust, the air in the adsorption means is inducted into the vacuum pump while the compressed air passes through the vacuum pump and then is exhausted together with the compressed air to the outside. In this process, vacuum is formed in the vacuum pump.

The so-called a 'vacuum sensing unit' is attached to the vacuum pump to detect an intensity of an internal pressure (-kPa) of the vacuum pump, and when the pressure reaches an appropriate level, an operation signal for a process after the adsorption, i.e., for transferring an object (work) is output.

Referring to FIG. 1, in general, a vacuum sensing unit (100) includes a case (101), in which a predetermined control part and a sensor are embedded, and an information display part (102) and a pressure setting part (103), which are provided on a front surface of the case (101), and a vacuum port (not shown) communicating with a separate vacuum pump is formed at one side of the case (101). In this drawing, reference numeral 104 denotes a cable for supplying power to the sensing unit (100). The sensing unit (100) is connected to the vacuum pump using the vacuum port as a medium to allow the sensor to detect an internal pressure of the vacuum pump, i.e., a vacuum pressure (-KPa).

Since an appropriate pressure level required for adsorption and transfer is different according to type or characteristics of an object, the pressure setting part (103) may be manipulated before the operation of the system to adjust and set signal output conditions of the corresponding sensing unit (100). Also, the sensing unit (100) outputs an operation signal when the pressure detected by the sensor during the operation of the system reaches a preset level, a robotic arm or the like operates to transfer the object to a predetermined position.

This sensing unit (100) is actually useful, and although unlike the sensing unit, a device that is functionally similar to the sensing unit is disclosed in Korean Patent Nos. 0523544 and 1860643.

Referring to FIG. 2, a plurality of vacuum pumps (110) may be simultaneously applied to perform the adsorption and transfer according to types or shapes of objects. In this case, the sensing unit (100) may be individually attached to each of the vacuum pump (110) to perform the above-described function. This is also commonly used in this technical fields, but, in particular, wherein:

the sensing unit (100) is required as many as the number of vacuum pumps and thus is very disadvantageous in several aspects such as installation, management, and operation;

it is impossible to collectively and efficiently control each of the sensor units (100) and sensors; and there is a problem in that processing of wirings of the entire system is complicated by a power cable (104) that is individually provided on each of the sensing units (100).

Prior Art Document

Korean Patent No. 0320503
Korean Patent No. 0523544
Korean Patent No. 1463041
Korean Patent No. 1860643

DISCLOSURE OF THE INVENTION

Technical Problem

The present invention is proposed to solve the problem of a vacuum sensing unit according to the above-described related art, and an object of the present invention is to provide a multi-sensing unit configured to be capable of individually and collectively controlling each of sensors while performing multi-sensing by corresponding to a plurality of vacuum pumps as a single unit. Another object of the present invention is to provide a multi-sensing unit capable of being driven by a single power cable.

Further another object of the present invention is to provide a vacuum multi-sensing unit that has a standardized operation mode to be selectively utilized.

Technical Solution

A vacuum multi-sensing unit, which is a device detecting an internal pressure of a vacuum pump to output a transfer operation signal for an object according to conditions in a vacuum transfer system, according to the present invention, the multi-sensing unit including:

a case, in which a control circuit part and a plurality of pressure sensors are disposed therein, a plurality of vacuum ports corresponding to the respective sensors are formed at one side thereof, and a pressure display part and a switch manipulation part are formed on a surface thereof, wherein the manipulation part includes:

a sensor-selection switch formed to select one or more of the sensors and a pressure setting part into which a pressure value is input as a condition for generating an 'arrival' signal for each of the sensors, which are sequentially selected through the sensor-selection switch, and the multi-sensing unit is configured so that, while the system is driven, when one or more sensors are selected at the same time by the sensor-selection switch, the circuit part outputs a transfer operation signal based on data of the arrival signal received from the respective selected sensors.

Preferably, the multi-sensing unit may include one connector formed at one side of the case and a cable connected to the connector, wherein the cable is designed so that a power line and an input/output signal transmission line are embedded in the cable to supply power and transmit a signal through the single cable.

In addition, preferably, the manipulation part may further include:
a mode-selection switch disposed on a surface of the case to selectively operate in modes stored in a memory of the control circuit part.

Advantageous Effects

The vacuum multi-sensing unit according to the present invention may be the unit including the plurality of sensors and be capable of individually and collectively controlling each of sensors while performing the multi-sensing by corresponding to the plurality of vacuum pumps as the single unit. Therefore, in particular, in the system in which the plurality of vacuum pumps are required to transfer the object, when compared to that the typical sensing unit is individually attached to each of the vacuum pumps, there may be very advantageous effect in aspects of efficiency of manufacturing, installation, management, operation, and control of the sensing unit.

Since the vacuum multi-sensing unit according to the present invention is designed to be driven by the single power cable, there may be the effect, in which, in particular, the processing of the wirings of the entire system is easily and simply performed while simplifying the driving method of the multi-sensing unit itself. In addition, the multi-sensing unit according to the present invention may further include the mode-selection switch. In this case, since the optimal driving pattern is capable of being selected, there may be the effect, in which the convenience in use and the safety in operation of the multi-sensing unit are improved.

BRIEF DESCRIPTION OF THE DRAWINGS

FIG. 1 is a view illustrating an outer appearance of a vacuum sensing unit according to a related art.

FIG. 2 is a view illustrating an example in application of the vacuum sensing unit of FIG. 1.

FIG. 3 is a perspective view illustrating an outer appearance of a vacuum multi-sensing unit according to the present invention.

FIG. 4 is a plan view of FIG. 3.

FIG. 5 is a block diagram illustrating an inner configuration of FIG. 3.

FIG. 6 is a view for explaining an operation of 'Mode 1' in a unit of FIG. 3.

FIG. 7 is a view for explaining an operation of 'Mode 2' in the unit of FIG. 3.

FIG. 8 is a view for explaining an operation of 'Mode 3' in the unit of FIG. 3.

FIG. 9 is a view for explaining an operation of 'Mode 4' in the unit of FIG. 3.

DESCRIPTION OF THE SYMBOLS

10. Multi-sensing unit
11. Case
12. Control circuit part
13. Sensor
14. Display part
15. Manipulation part
16. Vacuum port
17. Connector
18. Sensor-selection switch
19. Pressure setting part
20. LED
21. Memory
22. Mode-selection switch
23. Vacuum pump
24. Adsorption pad
25. Output window
'P'. Object

MODE FOR CARRYING OUT THE INVENTION

The technical features and effects of a 'vacuum multi-sensing unit' (hereinafter, referred to as a 'multi-sensing unit'), which is described above or not described above, according to the present invention will be more apparent through the description of embodiments described below with reference to the accompanying drawings. In FIG. 3, the multi-sensing unit according to the present invention is denoted by reference numeral 10.

Referring to FIGS. 3 to 6, the multi-sensing unit (10) according to the present invention is a device that is used together with a vacuum pump (23) in a vacuum transfer system and detects an internal pressure, i.e., a vacuum pressure (−kPa) of the vacuum pump (23) to determine whether a level of the pressure is satisfied within a certain condition, thereby outputting an operation signal for transferring an object (P). In this point, the multi-sensing unit is not different from the typical sensing unit.

The multi-sensing unit (10) includes, based on a case (11) having a predetermined shape, a control circuit part (12) and a plurality of pressure sensors (13), which are disposed in the case, a plurality of vacuum ports (16) formed in a line on one side surface to correspond to each of the sensors (13), and a pressure display part (14) and a switch manipulation part (15), which are formed on a surface of the case. In this embodiment, the sensors (13) and the vacuum ports (16) may one-to-one correspond to each other, but as necessary, the plurality of vacuum ports (16) may be designed to correspond to one sensor (13).

Also, the multi-sensing unit (10) further includes one LED output window (25) formed at an upper portion of the display part (14). In general, the system operates in one state of 'vacuum' or 'release' for repetitive adsorption and transfer of the object (P), and the output window (25) outputs OUT 1 LED green (G) or OUT 2 LED rad (R) to allow the operation state to be known. However, the OUT 1 and OUT 2 LEDs are not practical because sizes thereof are too small and separated from each other. Therefore, in this embodiment, the separate one output window (25) is provided so that different colors are output according to the operation state, and thus, it is implemented so that the state is capable of being checked even from a distance place. For example, if the operation state is OUT 1 LED green (G), a green color (G) is also output on the output window (25).

Preferably, the output window (25) is formed in an bent shape such as an approximately '⌐' shape and disposed at an edge portion of the case (11) to face top and side surfaces of the case (11). Thus, the operation state of the system may be easily checked with the naked eye even from the distant place.

Reference numeral 17 is provided as a cable 4-pin connector provided to supply power to the multi-sensing unit (10). Here, a single connector is provided in the case (11), and also, a single cable is connected to the connector (17). Thus, there is an advantage in that the driving method is simplified, and particularly, processing of wirings of the entire system is easy and convenient when compared to the typical method, in which the cable is provided for each sensing unit.

In the case of system configuration, the vacuum pump (23) may be individually connected to each vacuum port (16), and thus, each sensor (13) may detect the internal pressure of the corresponding vacuum pump (23). Also, in this embodiment, the display part (14) is a digital display part that numerically displays the pressure value (–kPa) of the vacuum pump (23), which is arbitrarily set for each sensor (31) or detected by each sensor (13), or their calculated values.

The manipulation part (15) includes a sensor-selection switch (18) formed to select one or more of the sensors (13) and a pressure setting part (10) into which the pressure value is input as a condition for generating an 'arrival' signal for each of the sensors (13), which are sequentially selected through the sensor-selection switch (18). Particularly, each sensor (13) may be selected by pressing each of switch (S1 to S8) buttons of the sensor-selection switch (18). Here, the manipulation part (15) is almost a button type switch, but may be implemented in a known different manner.

Also, the selected sensor (13) detects the pressure to generate a corresponding arrival signal when the pressure reaches a certain level. Here, the pressure level is previously set to an appropriate value by the pressure setting part (19). That is, the pressure setting part (19) is a means for setting the appropriate pressure value for the secure adsorption and transfer of a specific object (P), in particular, includes Up, Down and Setup buttons.

For example, since the object (P) has different characteristics in type, size, volume, weight, center of the weight, material, flatness, in particular, planar distribution of a surface, and the like, the appropriate pressure for the secure adsorption and transport may vary depending on the object (P) or adsorption conditions of the object (P) Thus, it is necessary to adjust and set the appropriate pressure for each sensor (13). First, when the switch (S1) is pressed, selection of a first sensor of the sensors (13) is displayed around the corresponding switch (S1), and then, the button of the setting part (19) is manipulated to set an appropriate pressure value. In the same manner, pressure values of all the sensors (13) may be individually set.

If the same pressure value is set for the plurality of switches (S1 and S2), all the switches (S1 and S2) may be pressed to be collectively set at the same time.

While the system is driven, when the internal pressure of each vacuum pump (23) is individually detected by each sensor (13) to reach respective set values, the control circuit part (12) outputs a transfer operation signal for the object (P) based on arrival signal data received from each sensor (13). Then, a means such as a robotic arm is activated by this signal to transfer the object (P) to a predetermined position.

Here, all the sensors (13) will operate normally. However, for example, some of the sensors (13) need to be consciously excluded from 'operation' according to the characteristics of the object (P) or the state of each vacuum pump. Thus, in the present invention, before the operation of the system, the sensor-selection switch (18) (S1 to S8) are pressed to individually limit the operation of each sensor (13). For example, if switches 'S1', 'S4', 'S6', and 'S8' of eight switches (18) are selected to be pressed, the corresponding sensor (13) operates, but the corresponding sensors of switches 'S2', 'S3', 'S5', and 'S7', which are selected, do not operate. The selected switch (18) is displayed through a lamp therearound.

As described above, in the present invention, one, some, or all of the sensors (13) are selected at the same time by the sensor-selection switch 18 so as to transfer the specific object (P), and the control circuit part (12) outputs the transfer operation signal based on the arrival signal data received from each selected sensor (13).

The multi-sensing unit (10) having the above-described configuration according to the present invention is a unit including the plurality of sensors (13) and performs multi-sensing to correspond to the plurality of vacuum pumps (23) as a single unit. Here, since each sensor (13) is individually and collectively controlled, it is very advantageous in terms of efficiency in manufacturing, installation, management, operation, and control of the sensing unit when compared to the typical sensing unit being individually attached to each vacuum pump.

In this embodiment, the manipulation part (15) further includes a mode-selection switch (22) that is capable of selectively operating in a plurality of operation modes stored in a memory (21) of the control circuit part (12). Thus, in each case, the system may be driven by selecting an appropriate mode in consideration of the type or characteristics of the object (P) to more conveniently and stably use the multi-sensing unit (10) according to the present invention.

The operation 'mode' applied in this embodiment is exemplified below.

[Mode 1]

Referring to FIG. 6, in this mode, the same pressure value is set for switches (S1), (S2), (S4), (S6), and (S8) selected by the sensor-selection switch (18) among the sensors (13), and when all of the selected sensors (13) detect the set pressure, the multi-sensing unit (10) is designed to output an 'operation' signal. Here, the pressure obtained by each selected sensor (13) is displayed on the display part (14) as a mean value. When a portion of the switches S1 to S8 is selected to be pressed during the operation of the system, the current detected pressure value of the corresponding sensor (13) is displayed to check an operation state, and this will be possible regardless of the type of modes.

In some cases, one or more of the sensors (13) may be randomly selected from the switches S1 to S8, and this mode may be suitably used for a transfer line, of which safety is required, and for repeated transfer of objects (P) having the same shape. Here, when the selected sensor (13) operates normally to reach a set pressure, a corresponding LED (20) is displayed in a green color (G).

[Mode 2]

Referring to FIG. 7, in this mode, the same pressure value is set for switches (S1), (S2), (S3), and (S4) selected by the sensor-selection switch 18 among the sensors (13), and even though some of the selected sensors (13) do not detect the set pressure, when a mean value of the pressures obtained by the respective selected sensors (13) reaches a mean value of the pressures set for the respective sensors, the multi-sensing unit (10) is designed to output an 'operation' signal. Here, the pressure obtained by each selected sensor (13) is displayed on the display part (14) as a mean value.

In some cases, one or more of the sensors (13) may be randomly selected from the switches S1 to S8, and this mode may be suitably used for transferring objects having variable shapes or objects having possibility of vacuum leakage such as plastic packs or thin films.

Here, when the selected sensor (13) operates normally to reach a set pressure, a corresponding LED (20) is displayed in a green color (G). If there is a sensor (13) that is selected above but does not detect the set pressure for a certain time or number of times, the corresponding LED (20) is displayed, for example, by blinking a red color (R) as its identification mark. This means that a problem occurs in a vacuum pump (23) or an adsorption means (24), and thus, check will be necessary.

[Mode 3]

Referring to FIG. 8, in this mode, different pressure values are set for the switches (S1), (S2), (S4), (S6), and (S8) selected by the sensor-selection switch (18) among the sensors (13), and when all of the selected sensors (13) detect the set pressure, the multi-sensing unit (10) is designed to output an 'operation' signal. Here, the pressure obtained by each selected sensor (13) is displayed on the display part (14) as a mean value.

In some cases, one or more of the sensors (13) may be randomly selected from the switches S1 to S8, and this mode may be suitable to transfer an object (P) having a non-uniform surface shape and possibility of vacuum leakage in a specific portion. Here, when the selected sensor (13) operates normally to reach a set pressure, a corresponding LED (20) is displayed in a green color (G).

[Mode 4]

Referring to FIG. 9, in this mode, all of the sensors (13) (S1 to S8) are automatically selected without operation of the sensor-selection switch (18), and in the setting part (19), the same pressure is set for all the sensors (13) at the same time, and when even a portion (S2) of the selected sensors (13) detects the pressure set for itself, the multi-sensing unit (10) is designed to output an 'operation' signal. Here, the highest value of the pressure value of the sensor (S2) or the pressure value obtained by each sensor (13) is displayed on the display part (14).

This mode may be suitably used to transfer an object (P) having a very irregular shape. In this case, the vacuum pump (23) and the adsorption pad (24) corresponding to some of the sensors (S2) described above may be disposed at the most certain position at which failure of adsorption is not predicted with respect to the object (P). Here, when some (S2) of the selected sensors (13) operate normally to reach the set pressure, the corresponding LED (20) is displayed in a green color (G).

As in the above modes 1, 2, and 4, when the same pressure value is set to the plurality of switches (e.g., S1 and S2) in the sensor-selection switch (18), all the corresponding switches (S1 and S2) may be pressed and then collectively set at the same time. As described above, the accumulated number of sensing for each sensor (13) may be stored in the memory (21) and thus may be used as data for evaluating lifespan of the corresponding sensor, work suitability, and the like.

The invention claimed is:

1. A vacuum multi-sensing unit, which is a device detecting an internal pressure of a vacuum pump (23) to output a transfer operation signal for an object (P) according to conditions in a vacuum transfer system, the vacuum multi-sensing unit comprising:
a case (11), in which a control circuit part (12) and a plurality of pressure sensors (13) are disposed therein, a plurality of vacuum ports (16) corresponding to the respective sensors (13) are formed at one side thereof, and a pressure display part (14) and a switch manipulation part (15) are formed on a surface thereof,
wherein the manipulation part (15) comprises a sensor-selection switch (18) (S1 to S8) formed to select one or more of the sensors (13) and a pressure setting part (10) into which a pressure value is input as a condition for generating an 'arrival' signal for each of the sensors (13), which are sequentially selected through the sensor-selection switch (18), and
while the system is driven, when one or more sensors (13) are selected at the same time by the sensor-selection switch (18), the circuit part (12) outputs a transfer operation signal based on data of the arrival signal received from the respective selected sensors (13).

2. The vacuum multi-sensing unit of claim 1, further comprising one connector (17) formed at one side of the case (11) and a cable connected to the connector (17),
wherein the cable is designed so that a power line and an input/output signal transmission line are embedded in the cable to supply power and transmit a signal through the single cable.

3. The vacuum multi-sensing unit of claim 1, wherein the pressure setting part (19) is a means for setting an appropriate pressure value for the secure adsorption and transfer of a specific object (P) and comprises Up, Down, and Setup buttons.

4. The vacuum multi-sensing unit of claim 1, wherein each of the selected switches (S1 to S8) of the sensor-selection switch (18) is displayed through a lamp therearound.

5. The vacuum multi-sensing unit of claim 1, wherein, when the same pressure value is set to the selected switches (S1 to S8) of the sensor-selection switch (18), all the corresponding switches (S1 to S8) are selected and simultaneously collectively set.

6. The vacuum multi-sensing unit of claim 1, further comprising one LED output window (25) formed at one side of the display part (14),
wherein the output window (25) outputs the same color to correspond to an OUT 1 LED or OUT 2 LED color, which shows an operation state of 'vacuum' or 'release' of the system.

7. The vacuum multi-sensing unit of claim 6, wherein the output window (25) is formed in a shape that is bent in a ' ⌐ ' shape and disposed at an edge portion of the case (11) to face top and side surfaces of the case (11).

8. The vacuum multi-sensing unit of claim 1, wherein the manipulation part (15) further comprises a mode-selection switch (22) that is capable of selectively operating in a plurality of operation modes stored in a memory (21) of the control circuit part (12).

9. The vacuum multi-sensing unit of claim 8, wherein the mode comprises a manner in which, the same pressure value is set for the sensor (13) selected by the sensor-selection switch (18) among the sensors (13), and when all the selected sensors (13) detect the set pressure, an 'operation' signal is output.

10. The vacuum multi-sensing unit of claim 8, wherein the mode comprises a manner in which, the same pressure value is set for the sensor (13) selected by the sensor-selection switch (18) among the sensors (13), and even though some of the selected sensors (13) do not detect the set pressure, when a mean value of the pressures obtained by the respective selected sensors (13) reaches a mean value of the pressures set for the respective sensors, an 'operation' signal is output.

11. The vacuum multi-sensing unit of claim 10, wherein, in the mode, if there is a sensor of the selected sensors (13), which does not detect the set pressure for a certain time or number of times, an identification mark is output on the corresponding LED (20).

12. The vacuum multi-sensing unit of claim 8, wherein the mode comprises a manner in which, different pressures are set for the sensor (13) selected by the sensor-selection switch (18) among the sensors (13), and when all the selected sensors (13) detect the set pressure, an 'operation' signal is output.

13. The vacuum multi-sensing unit of claim 8, wherein the mode comprises a manner, in which all the sensors (13)

become a state of being automatically selected, and the same pressure is set for all the sensors (13) in the setting part (19), and when even some of the sensors (13) do not detect the set pressure, an 'operation' signal is output.

14. The vacuum multi-sensing unit of claim 1, wherein the accumulated number of sensing for each sensor (13) is stored as data in a memory (21) of the control circuit part (12).

* * * * *